US00H002292H

(19) United States
(12) Statutory Invention Registration
Richardson

(10) Reg. No.: US H2292 H
(43) Published: Jun. 3, 2014

(54) MATERIALS OF CONSTRUCTION FOR A GAS TURBINE

(75) Inventor: James Anthony Richardson, Durham (GB)

(73) Assignee: INVISTA North America S.a.r.l., Wilmington, DE (US)

(21) Appl. No.: 13/447,927

(22) Filed: Apr. 16, 2012

(65) Prior Publication Data

US 2013/0272916 A1 Oct. 17, 2013

(51) Int. Cl.

| | |
|---|---|
| ***F02C 7/30*** | (2006.01) |
| ***C22C 19/07*** | (2006.01) |
| ***C22C 19/03*** | (2006.01) |

(52) U.S. Cl.
USPC ..... 420/435; 420/441

(58) Field of Classification Search
USPC ..... 420/435
See application file for complete search history.

(56) References Cited

U.S. PATENT DOCUMENTS

| | | | | |
|---|---|---|---|---|
| 6,974,638 | B2 * | 12/2005 | Stamm | 420/437 |
| 7,597,843 | B2 * | 10/2009 | Yoshinari et al. | 420/448 |
| 2004/0170521 | A1 * | 9/2004 | Stamm | 420/437 |
| 2007/0235110 | A1 * | 10/2007 | Yoshinari et al. | 420/442 |
| 2013/0272916 | A1 * | 10/2013 | Richardson | 420/435 |

* cited by examiner

*Primary Examiner* — Daniel Pihulic
(74) *Attorney, Agent, or Firm* — INVISTA North America S.a.r.l.

(57) ABSTRACT

The present invention relates to a means to protect gas turbine components against corrosion from a gaseous stream, produced from an oxidation reaction the reaction being conducted in a continuous oxidation reactor

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MATERIALS OF CONSTRUCTION FOR A GAS TURBINE

FIELD OF THE INVENTION

This invention relates to gas turbine components for reduced corrosion when in contact with off gas from paraxylene oxidation. Specifically, the invention relates to gas turbine components constructed of nickel and cobalt based super alloys with aluminide and MCrAIY coatings.

BACKGROUND OF THE TECHNOLOGY

The production of terephthalic acid (TA) typically involves the liquid phase oxidation of para-xylene (PX) feedstock using molecular oxygen in acetic acid as a process solvent, in the presence of a dissolved heavy metal catalyst system usually incorporating a promoter, such as bromine as disclosed in U.S. Pat. No. 2,833,816. In general, acetic acid, molecular oxygen in the form of air, para-xylene and catalyst are fed continuously into the oxidation reactor at elevated temperature and pressure, typically a temperature from about 150° C. to about 250° C. and a pressure from about 100 kPa to about 5000 kPa.

Para-xylene oxidation produces a high-pressure gaseous stream (or "off-gas") which comprises nitrogen, unreacted oxygen, carbon dioxide, carbon monoxide and, where bromine is used as a promoter, methyl bromide. In addition, because the reaction is exothermic, the acetic acid solvent is frequently allowed to vaporize to control the reaction temperature and is removed in the gaseous stream. This vapour is typically condensed and most of the condensate is refluxed to the reactor, with some condensate being withdrawn to control reactor water concentration. The portion of the gaseous stream which is not condensed is either vented or passed through a catalytic combustion unit (CCU) to form an environmentally acceptable effluent, as disclosed in publication WO 96/39595. Catalytic combustors have been deployed on TA plants typically upstream of an energy recovery step. Their function is to catalytically combust volatile organic compounds (VOC's) and carbon monoxide and effect complete conversion of any methyl bromide content to HBr and/or Br2. The resulting gas stream can be passed to an energy conversion device, such as an expander, under controlled conditions of pressure and temperature whereby condensation of HBr and/or Br2 is substantially prevented thereby allowing the energy conversion device to be fabricated from relatively inexpensive materials.

In TA production plants power recovery, for example as disclosed in publication 96/39595, is conventionally carried out using an expander at temperatures from about 150-750 ° C., typically 450° C. However, there is scope to improve power recovery using an expander by changes to the configuration of the manufacturing process and the means for recovering power from the process. An improved power recovery system with methods for recovering more power from the gaseous streams of oxidation reactions have been disclosed in publication WO 09/136146. This publication describes an Internal Combustion Open Cycle Gas Turbine (ICOCGT), as disclosed in API 616 Gas Turbines for the Petroleum, Chemical and Gas Industry Services, utilising a standard gas turbine.

The materials of construction for such machines have been developed to avoid corrosion at high temperatures in an oxidative environment and without chemical contamination. Hot section components for land-based turbines are constructed typically in superalloys, protected by coatings that are resistant to oxidation and corrosion which can be overlayed by thermal barrier coatings. The corrosion resistance of the protective coatings arise from their capacity to form protective oxide surface layers at elevated temperatures. Gas turbines generally operate in relatively oxidising gases that contain significant levels of oxygen, typically about 14% WI, However, lower levels of oxygen, such as those in the off-gas from para-xylene oxidation, can prevent or inhibit the formation of protective oxides on coatings. Also, small levels of HBr, up to 100 ppm w/w, can promote the formation of volatile bromides of alloy and coating constituent elements. The off-gas from para-xylene oxidation typically comprises an oxygen concentration less than about 5% w/w, and oxidation catalyst co-factor and by-products comprising organobromides, bromine and acidic bromides.

SUMMARY OF THE INVENTION

The consequence of these combined problems is the need to protect the internal components of a gas turbine against corrosion or degradation due to the composition of off-gas streams from para-xylene oxidation. It is therefore an object of the invention to provide suitable materials of construction for a standard gas turbine to cost- effectively improve power recovery on a PTA production plant.

Disclosed is a coating composition that protects components of a gas turbine against corrosion when in contact with off-gas from para-xylene oxidation. Such streams include the off gas from the oxidation reactor, comprising reduced concentrations of oxygen and corrosive contaminants including oxidation catalyst co-factor and by-products, such as HBr, MeBr and $Br_2$. Surprisingly, the present invention can be characterised by gas turbine components constructed in nickel- and cobalt-based superalloys, protected by aluminide and MCrAIY coatings that can be overlayed, where required by thermal barrier coatings to reduce enhanced corrosion in combustion gases containing low concentrations of oxygen or in para-xylene oxidation off-gases comprising oxygen and oxidation catalyst co-factors and by products, including HBr.

DETAILED DESCRIPTION

The present invention can be characterised by gas turbine components constructed in nickel- and cobalt-based superalloys protected by aluminide and MCrAIY coatings which can be overlayed, where required by thermal barrier coatings, to reduce enhanced corrosion in combustion gases comprising low concentrations of oxygen such as para-xylene oxidation off-gases comprising oxygen and oxidation catalyst co-factor and by products, including HBr.

In a TA production plant power recovery using an expander is typically carried out at temperatures from about 150-750 ° C., including 450° C. Improved power recovery may be achieved by heating the gaseous stream from the oxidation reaction to a temperature between 800-1300° C., including between 800-1100° C. and about 1050° C., and recovering energy through an expander. At such temperatures expanders provide significantly improved power recovery relative to expanders at about 450° C. The improved power recovery more than offsets the additional cost of heating the off-gas and the additional power recovered from the higher temperature gaseous stream can be recovered, e.g. utilised elsewhere in the oxidation process or to generate electricity. The expander can be an integral component of a gas turbine, such as an ICOCGT, comprising a compressor, a combustor and a turbine.

A gas turbine can be beneficially integrated into a TA production plant where the compressor stage of the ICOCGT compresses the oxidant feed to the reactor (at greater than atmospheric pressure) thereby by at least partially offsetting the cost of providing the high temperature and pressure reaction conditions in the reactor. The turbine stage of the ICOCGT expands the heated gaseous stream from the oxidation reactor recovering energy to power the compressor and a hot gas stream, from which energy can be recovered downstream of the ICOCGT, as disclosed in publication WO 09/136146.

The mechanical properties for the materials used to construct the turbine and hot section components in an 1COCGT must be durable to operate at the above conditions. For land-based turbines nickel- and cobalt-based alloys can be used. Turbine blade/bucket alloys typically can be nickel-based containing up to about 20% w/w chromium, up to about 20% w/w cobalt and other alloying elements, comprising in any combination molybdenum, titanium, tantalum, aluminium, tungsten and niobium.

Nozzles/vanes are subjected to higher temperatures than blades/buckets and are constructed in nickel-based alloys containing typically up to about 20% w/w cobalt, or cobalt-based alloys containing typically up to about 20% w/w nickel. All alloys that can be used also contain up to about 28% w/w chromium and other alloying elements, including in any combination molybdenum, titanium, tantalum, aluminium, tungsten and niobium.

Combustion system materials are also commonly constructed in nickel-, cobalt- or iron-based alloys, comprising up to about 24% w/w chromium and other alloying elements, including in any combination molybdenum, titanium, aluminium and tungsten. Typically, nickel-based alloys that can be used comprise up to about 24% w/w chromium and up to about 20% w/w cobalt and other alloying elements, including molybdenum, iron and aluminium.

Discs can be constructed in high strength, low alloy steels or nickel-based alloys, depending on the operating temperature. Typically, nickel-based alloys that can be used comprise up to about 21% w/w chromium, up to about 18% w/w iron and other alloying elements, including niobium and molybdenum.

In normal operation, the alloys used to construct the internal components of a gas turbine require further protection against oxidation, corrosion and high temperatures, typically by the application of protective coatings. Different types of coatings can be applied to protect the superalloys already described, however, to protect the components against oxidation and corrosion two types of coatings are preferred.

1. Diffusion coatings applied at high temperatures at which aluminium and/or chromium and/or silicon are diffused into the surface of the alloy from a surrounding vapour. The vapour is commonly created by the thermal decomposition of particulate source materials. The coating consists of intermetallic products of reaction between the substrate and diffused elements. Coatings produced by the diffusion of aluminium consist principally of nickel and cobalt aluminides containing typically about 35-40% w/w aluminium. In some cases, co-diffusion of silicon produces coatings that also contain about 5% w/w silicon.
2. MCrAIY coatings, comprising M=cobalt and/or Ni, can be applied by spray processes, such as high velocity oxy-fuel (HVOF) or plasma in air (APS) or at low pressures (LPPS) or under vacuum (VPS). The composition of the coating can vary dependent on the combination of materials selected for spraying. Nickel- and/or cobalt-based coatings comprise about 25% w/w chromium, about 15% w/w aluminium and about 0.5% w/w yttrium.

For thermal barrier coatings yttria stabilised zirconia (YSZ) can be used. The coating can be applied in thicknesses up to about 200 microns by processes including plasma spray in air (APS), low pressure plasma spray (LPPS) or electron beam physical vapour deposition (EBPVD). Thermal barrier coatings offer little or no resistance to oxidation/corrosion and can be typically applied over oxidation/corrosion resistant aluminide or MCrAIY coatings.

The hot section of gas turbines normally operates in relatively oxidising gases that contain significant levels of oxygen, typically up to about 14% w/w. However, when coupled to a TA production plant the off-gas composition fed to a gas turbine is significantly different and the risk of corrosion of turbine components in service is increased. The increase is due to a reduced oxygen concentration and oxidation catalyst co-factor and byproducts in the TA off-gas. Significantly lower levels of oxygen, as low as about 1% w/w, can prevent or inhibit the formation of protective oxides on coatings and alloy substrates and small levels of HBr, up to about 100 ppm w/w, can promote the formation of volatile bromides of alloy and coating constituent elements.

EXAMPLES

The following examples further illustrate the disclosed compositions.

EXAMPLE 1

Thermodynamic stability has been calculated to estimate the performance of a range of metals in the alternative range of conditions. Calculations have been made for 950, 1000and 1050° C. and 16 bara for the metallic elements Al, Cr, Co, Cu, Fe, Nb, Ni, Mo, Mn, Si and W to determine the equilibrium composition in a gas with the following composition that contains more than 1.5×the maximum anticipated level of HBr in service:

TABLE 1

Gas composition for thermodynamic stability calculations

| Basis | N2 | CO2 | O2 | CO | H2O | HBr |
|---|---|---|---|---|---|---|
| % v/v | 86.6 (balance) | 7.9 | 0.5 | 0.01 | 5.0 | 30 ppm |
| % w/w | 84.2 (balance) | 12.1 | 0.6 | 0.01 | 3.1 | 166 ppm |

Phase diagrams have been calculated for a range of oxygen and bromine fugacities, from a gas bromine level of $10^{-6}$ to $10^{-2}$ bar; the higher fugacities to illustrate the potential effects of bromine concentration at the bases of cracks in protective oxides/coatings.

The calculations predicted copper forms volatile bromides across the whole range of bromine concentrations. No other metal formed critical amounts of bromides at the lower bromine level. However, at the higher bromine level cobalt, nickel, molybdenum and iron form bromides with activities in the range $10^{-4}$ to $10^{-5}$ bar, indicating possible formation of metal halide and possible corrosion.

EXAMPLE 2

Experimental Tests—1

A series of tests was undertaken at 1 bara, with a gas composition as shown in Table 2. The HBr level is about 3×the maximum anticipated level of HBr in service:

TABLE 2

| Gas composition for experimental tests - 1 | | | | | | |
|---|---|---|---|---|---|---|
| Basis | N2 | CO2 | O2 | CO | H2O | HBr |
| % v/v | 84.5 (balance) | 4.0 | 0.5 | 0.03 | 11.0 | 100 ppm |
| % w/w | 85.8 (balance) | 6.4 | 0.6 | 0.03 | 7.2 | 294 ppm |

Samples of the alloy/coating systems in Table 3 were tested in an unloaded condition for a total of 1000 h. Samples were subjected to daily cooling to temperatures below 200° C. for 3 hours and re-heating up to temperatures between 850 and 1050° C. for 21 hours.

TABLE 3

| Test conditions for experimental tests - 1 | | | |
|---|---|---|---|
| Component | Representative Alloy | Coating | Temperatures ° C. |
| Blades/buckets | Ni-based | Uncoated | 950/1050 |
| | | Aluminised | 950/1050 |
| | | HVOF MCrAlY | 950/1050 |
| | Ni-based | Uncoated | 850/950 |
| | | Chromised | 850/950 |
| Nozzles/vanes | Ni-based | Uncoated | 950/1050 |
| | | Aluminised | 950/1050 |
| | Co-based | Uncoated | 950/1050 |
| | | Aluminised | 950/1050 |
| Combustors/ ducts | Ni-based | HVOF MCrAlY | 950/1050 |
| | | HVOF MCrAlY + TBC | 950/1050 |
| Discs | Ni-based | Uncoated | 850/950 |
| | | Chromised | 850/950 |

Mass changes during the test were measured for all samples and macroscopic evidence of coating spallation and other changes were recorded. At the conclusion of the tests, cross sections of all specimens were prepared and the microstructures observed with regard to scale thickness, spallation, depth of inward directed oxidation and depletion. The oxide scales and thicknesses of the internally oxidised and nitrided zones were measured. Element mapping of sections was undertaken using electron probe microanalysis (EPMA).

The results from the experimental test for the materials used to fabricate gas turbine components indicated:

1. There is no apparent loss of protection of aluminide or MCrAlY coatings arising from the low oxygen content of the gas. Chromide coatings are unprotective because of the formation of volatile $CrO_4H_2$ in gases containing both $H_2O$ and $O_2$ at temperatures above about 650° C.
2. HBr content. There is no evidence of significant deterioration arising from the formation of volatile bromides, nor any evidence of bromine uptake in any of the sections, within the detection limits of the EPMA technique.

EXAMPLE 3

Experimental Tests—2

A series of tests were undertaken at 1 bara gases to investigate whether cracks in protective oxides/coatings are sites of increased corrosion risk. Three gas compositions were used:

low oxygen gas (Table 1)

laboratory air containing up to 4% v/v water to simulate a typical combustion gas with relatively high oxygen content from a conventional application intermediate oxygen concentration and containing more than 3×the maximum anticipated level of HBr in service (Table 4)

TABLE 4

| Gas composition for experimental tests - 2 | | | | | | |
|---|---|---|---|---|---|---|
| Basis | N2 | $CO_2$ | $O_2$ | CO | $H_2O$ | HBr |
| % v/v | 74.1 (balance) | 4.0 | 6.9 | 50 ppm | 15 | 100 ppm |
| % w/w | 75.7 (balance) | 6.4 | 8.1 | 50 ppm | 9.8 | 295 ppm |

In these three environments, samples of different alloy/coating systems were tested.

i) A commercial diffusion coating formed from an applied slurry comprising about 36% w/w aluminium and about 6% w/w silicon.

ii) MCrAlY/LPPS a commercial, cobalt-based coating comprising about 32% w/w nickel, about 21% w/w chromium, about 8% w/w aluminium and about 0.5% w/w yttrium.

TABLE 5

| Test conditions for experimental tests - 2 | | | |
|---|---|---|---|
| Component | Representative Alloy | Coating | Temperature ° C. |
| Blades/ buckets | Ni-based | MCrAlY/LPPS | 1000 |
| Nozzles/vanes | Ni-based | Diffused slurry | 1000 |
| | Co-based | MCrAlY/LPPS | 1000 |

Samples were strained in a creep-testing rig at a strain rate higher than about $\mathbf{10}^{-8}S^{-1}$. Above this strain rate, regarded as a critical creep rate, access of the environment to the substrate alloy can occur and any cracks formed cannot heal by oxidation. Samples were exposed to 5 cycles of heating to 1000° C. and cooling down every 100 hours for a total exposure time of 500 hours. Accumulated strains at the completion of the tests were in the range about 5-12%. To introduce coating cracks prior to exposure some samples were pre-cracked by straining up to about 2% total strain at room temperature. Crack formation was monitored by acoustic emission (AE). At the conclusion of the tests samples were examined using metallographic and microanalytical procedures.

Neither the pre-cracking treatment nor the significant straining at elevated temperatures produced visible, through thickness cracks in the coatings. The results indicate:

1. Low oxygen content. Both coatings form protective oxides in all three environments. The MCrAlY coating exhibits particularly high corrosion resistance, but the performance of the diffused slurry coating is adequate.
2. HBr content. There was no evidence of significant deterioration from the formation of volatile bromides. Also, there was no evidence of bromine uptake in any of the sections, within the detection limits of the EPMA technique. The coatings, if applied correctly, remain highly protective in the HBr-containing environments.

Thermodynamic calculations and experimental tests in gases with a low oxygen concentration and a significant HBr content have demonstrated that gas turbine components constructed in nickel- and cobalt-based superalloys protected by aluminide and MCrAlY coatings have satisfactory corrosion resistance in the following applications:

1. Combustion gases containing levels of oxygen as low as 0.6% w/w.
2. PTA oxidation reactor off-gas containing levels of oxygen as low as 0.6% w/w and levels of HBr as high as about 300 ppm w/w.

While the invention has been described in conjunction with specific embodiments thereof, it is evident the many alternatives, modifications and variations will be apparent to those skilled in the art in light of the foregoing description. Accordingly, the invention is intended to embrace all such alternatives, modifications and variations as fall within the spirit and scope of the claims.

What is claimed is:

1. A composition for protecting gas turbine components against corrosion from a paraxylene oxidation off-gas stream comprising nickel- and cobalt-based superalloys.

* * * * *